June 30, 1942.　　　G. M. KLEUCKER　　　2,288,003
AIR CONDITIONING APPARATUS
Filed June 12, 1939　　　3 Sheets-Sheet 1

INVENTOR
GEORGE M. KLEUCKER
BY
ATTORNEY.

June 30, 1942.  G. M. KLEUCKER  2,288,003
AIR CONDITIONING APPARATUS
Filed June 12, 1939   3 Sheets-Sheet 2

INVENTOR
GEORGE M. KLEUCKER
BY
ATTORNEY

June 30, 1942.  G. M. KLEUCKER  2,288,003
AIR CONDITIONING APPARATUS
Filed June 12, 1939   3 Sheets-Sheet 3
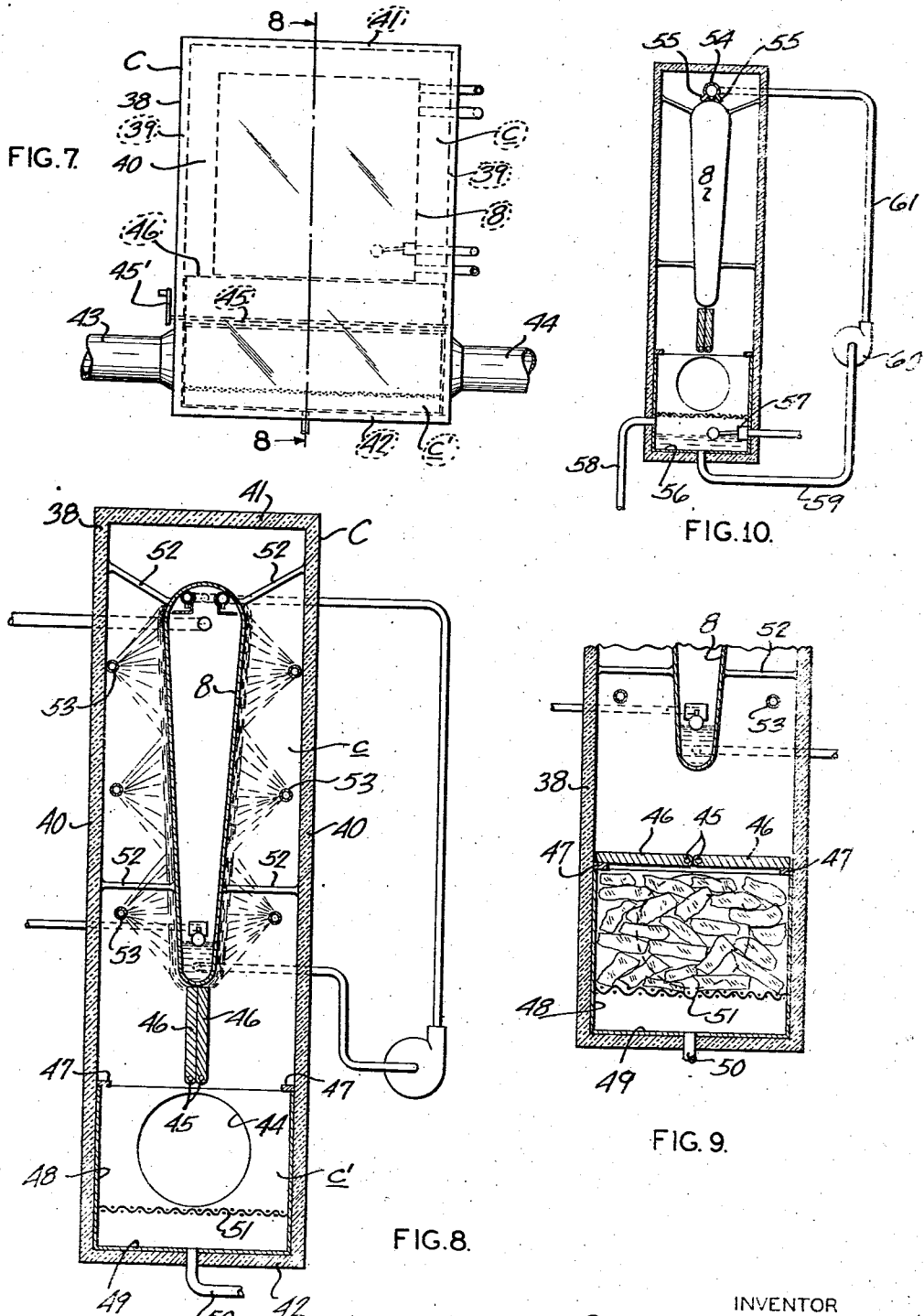
INVENTOR
GEORGE M. KLEUCKER
BY
ATTORNEY.

Patented June 30, 1942

2,288,003

UNITED STATES PATENT OFFICE 2,288,003

AIR CONDITIONING APPARATUS

George M. Kleucker, St. Louis, Mo., assignor to Midwest Coolers, Inc., St. Louis, Mo., a corporation of Missouri Application June 12, 1939, Serial No. 278,607

6 Claims. (Cl. 62—133)

This invention relates to a certain new and useful improvement in air conditioning apparatus.

My invention has for its primary object the provision of air conditioning apparatus which may be cheaply constructed, which is unusually economical in cost of maintenance, and which may be operated at extremely low cost.

My invention also has for an object the provision of air conditioning apparatus which is especially particularly well adapted for small size commercial installations at extremely low installation as well as operating cost, which uniquely maintains the conditioned air at a relatively satisfactory humidity in a simple, inexpensive manner, and which is highly efficient in the performance of its stated functions.

And with the above and other objects in view, my invention resides in the novel features of form, construction, arrangement, and combination of parts presently described and pointed out in the claims.

In the accompanying drawings (3 sheets):

Figure 7 is a reduced side elevational view of another modified form of air conditioning apparatus constructed in accordance with and embodying my present invention;

Figure 8 is a transverse sectional view of the apparatus of Figure 7, taken approximately along the line 8—8, Figure 7;

Figure 9 is an enlarged fragmentary transverse sectional view of the apparatus of Figures 7 and 8; and Figure 10 is a reduced transverse sectional view of a modified form of the apparatus of Figures 7 and 8.

Figure 1:
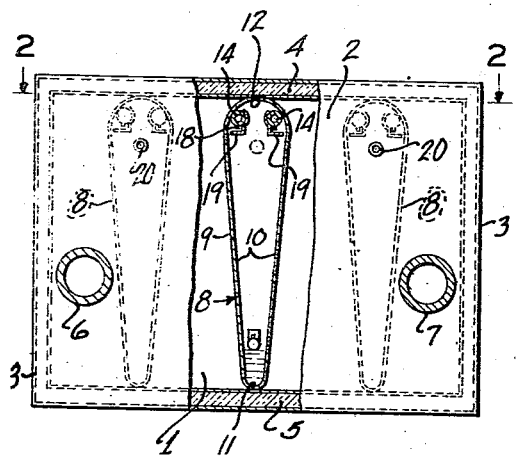
Figure 1 is a side elevational view, partly broken away and in section, of air conditioning apparatus constructed in accordance with and embodying my present invention.
Figure 2:
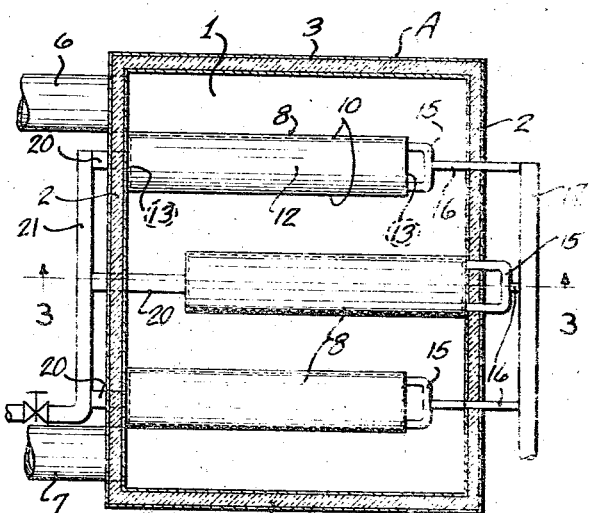
Figure 2 is a longitudinal sectional view of the apparatus, taken approximately along the line 2—2, Figure 1.

Referring now in more detail and by reference characters to the drawings, which illustrate practical embodiments of my present invention, the apparatus, generally designated A, includes a preferably box-like chamber or air-tunnel 1 having suitably connected insulated side walls 2, end walls 3, a top wall 4, and a bottom wall 5, and projecting into the chamber 1 through one of the side walls 2 preferably adjacent the opposite vertical margins thereof, and remotely connected to blower fans and other conventional air handling equipment, for purposes of simplification, not here shown, are insulated air ducts 6, 7, all as best seen in Figures 1 and 2.

Disposed in staggered relation upon the inner faces of the respective side walls 2, is a plurality of coolers or heat exchange units 8 each extending transversely across the chamber 1 for a distance somewhat less than the transverse width thereof in the manner of a baffle, thereby causing the air flowing through the chamber 1 from the duct 6 to the duct 7 to follow a more or less serpentine-like path and come into intimate heat exchange contact with the various coolers 8, all as best seen in Figure 2.

Figure 3:
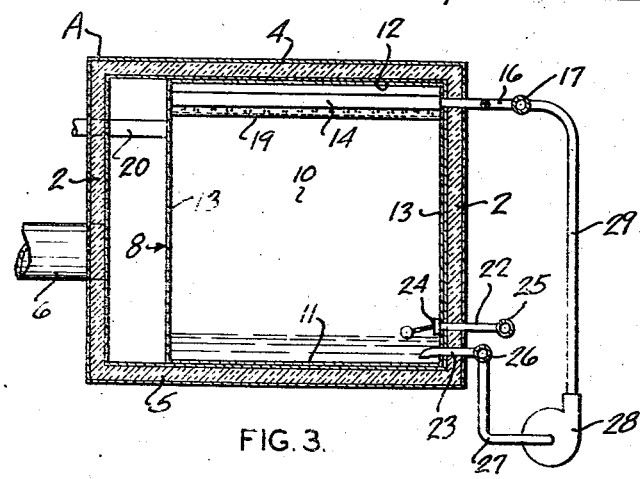
Figure 3 is a transverse sectional view of the apparatus, taken approximately along the line 3—3, Figure 2.

Each of the coolers 8 includes a metallic shell 9 having a pair of upwardly diverging side walls 10 connected preferably integrally at their lower extremities by an arcuate or trough-shaped bottom wall 11 and at their upper extremities by an arcuate or dome-shaped top wall 12, and welded or otherwise hermetically sealed to said side, top, and bottom walls are opposed parallel end walls 13, forming an elongated somewhat tubular shell having a transverse cross-section substantially resembling an inverted tear-drop, all as best seen in Figures 2 and 3 and for purposes presently appearing.

Operatively mounted in, and extending between, the end walls 13 of each cooler 8, is a pair of opposed parallel distributing headers 14, which at one end project through one of the end walls 13 and are connected in parallel, so to speak, by means of a U-shaped cross connector pipe 15, in turn, connected to a supply pipe 16 extending through one of the chamber side walls 2 and connected at its outer end to a horizontally disposed supply header 17.

Interiorly of the shell 9, each of the distributing headers 14 is provided with a plurality of longitudinally spaced downwardly projecting discharge tubes 18 and a horizontally disposed distributing flange 19, all as more fully described and disclosed in my copending application, Serial No. 263,865, filed March 24, 1939.

Mounted in the opposite end wall 13 and opening into the cooler shell 9, is a suction pipe 20 extending outwardly preferably through the adjacent chamber side wall 2 and connected at its outer end to a suction header 21, all as best seen in Figure 2 and for purposes presently appearing.

Also extending through one of the chamber side walls 2 and the adjacent cooler end wall 13, are a liquid supply line 22 and a liquid recirculating line 23, the former being provided at its inner end with a float control valve 24 adapted for maintaining a predetermined liquid level in the bottom of the cooler shell 9 and at its outer end connected to a liquid supply header 25, in turn, connected to a conventional type of liquid refrigerant condenser-receiver (not shown). The recirculating line 23 opens at its inner end into the cooler shell 9 adjacent the lowest point thereof and is connected at its outer end through a recirculation header 26 and a pipe line 27 to the intake port of a conventional recirculating pump 28, in turn, connected at its discharge port through a header supply line 29 to the header 17. Instead of a conventional pump, I also may use an ejector preferably submerged in liquid refrigerant for recirculation.

In use and practice, liquid refrigerant enters each of the coolers 8 through the fluid control valve 24 expanding at the predetermined back pressure for which the apparatus is set, a certain amount of the incoming liquid refrigerant flashing into gas corresponding in temperature to the setting of back pressure control valve and thereby cooling the remainder of the liquid which fills the lower portion of the cooler shell 9 to the predetermined level. Meanwhile the cold liquid refrigerant is withdrawn through the recirculation header 26 and the pipe line 27 and is delivered by the pump 28 to the discharge headers 14, cascading therefrom over the inner faces of the respective cooler shell side walls 10 in a copiously flowing substantially uninterrupted sheet or film, producing an extremely efficient cooling effect through the shell walls 10 upon the air passing through the chamber 1.

It will be evident that the present apparatus is extremely economical in constuction, operation, and maintenance and is capable of cooling an unusually large volume of air at an extremely rapid rate. In addition, the present air conditioning apparatus may be quickly and conveniently defrosted by the simple expedient of raising the back pressure until it is equivalent to the pressure of the incoming liquid refrigerant. If desired, additional means of heating the recirculating means may be employed. When this condition prevails, the incoming liquid refrigerant will remain at the relatively higher temperature and will actually serve as a heating medium for melting off the frost which has formed on the exterior surfaces of the shell 9.

Figure 4:
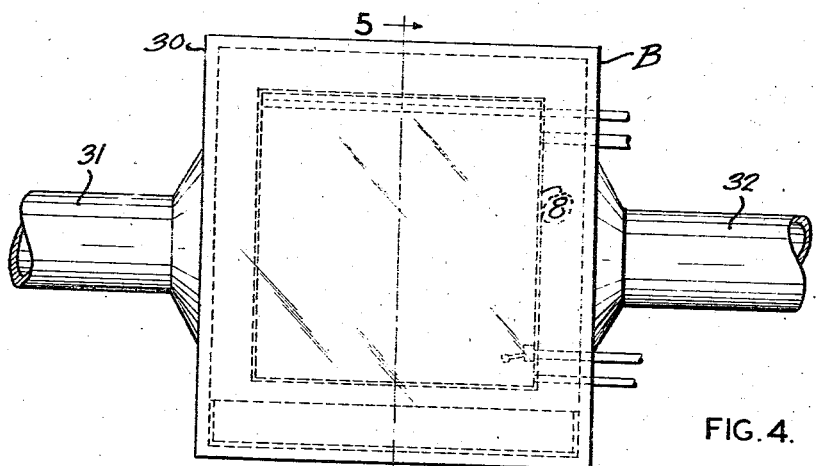
Figure 4 is a reduced side elevational view of a modified form of air conditioning apparatus constructed in accordance with and embodying my present invention.
Figures 5, 6:
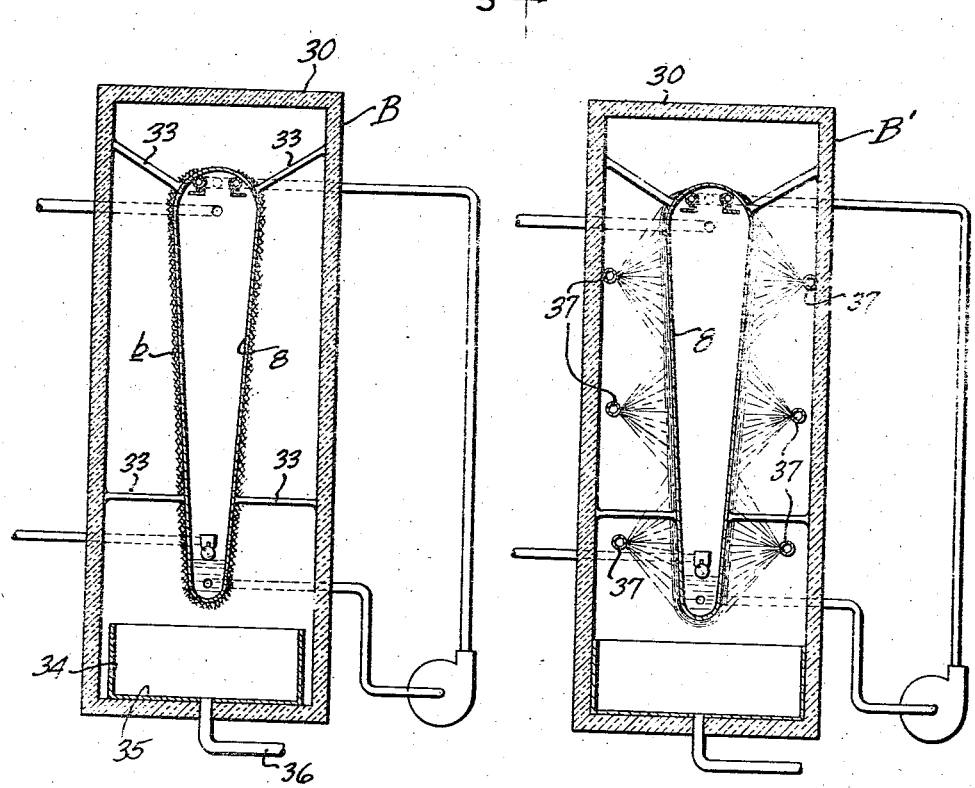
Figure 5 is a transverse sectional view of the apparatus of Figure 4, taken approximately along the line 5—5, Figure 4.
Figure 6 is a further modified form of air conditioning apparatus constructed in accordance with and embodying my present invention.

For small commercial installations, such as neighborhood and small town movie theaters, small meeting halls and auditoriums, and other types of structures, which are only used for relatively few hours during the day, a simplified form of air conditioning apparatus B (as shown in Figures 4 and 5) may be provided, such apparatus including a preferably rectilinear heat insulated chamber 30 having air ducts 31, 32, operatively mounted in opposed walls thereof. Supported within the chamber 30 by means of suitable tie rods 33, is a single cooler unit 8 operably connected and set up in identically the manner previously described. Also mounted within the chamber 30 beneath the cooler 8, is a conventional catch basin 34 provided in its bottom wall 35 with a drain pipe 36.

In humid climates, the air conditioning apparatus B may be set in operation and run for a period of twelve to fifteen hours, for instance, during which time a substantial coating b of ice and frost will collect upon the outer surfaces of the cooler 8, thereby, in effect, storing up a substantially large quantity of potential cooling effect which will be sufficient to cool the building or auditorium for several hours during which it is in use.

As will be readily apparent, this type of air conditioning apparatus enables the employment of a compressor and other high side equipment of relatively small size and capacity, thus effecting considerable economies in cost of initial installation, as well as in subsequent operation and maintenance. In the case of a small town movie theater which operates only for a few hours in the evening of each day, the resulting economies will be immediately apparent. Present day compressors and other "high side" equipment are not only designed to stand continuous operation, but actually function more effectively and efficiently when the operation is substantially continuous. It will, therefore, be evident that the present apparatus enables the installation of equipment of one-fourth or one-third the ordinarily required capacity and by operation thereof continuously produce an adequate cooling effect over a short period of five or six hours in the building or auditorium with which it is associated.

In the event the climate in a particular locality where the installation is being effected is more or less arid, so that the humidity is not sufficient to supply the desired storage coating of frost and ice, I may then provide a modified form of air conditioning apparatus B', as shown in Figure 6, which is substantially identical in all respects with the previously described air conditioning apparatus B, except that the chamber 30 is provided with a plurality of water spray pipes 37 for showering the outer faces of the cooler unit 8 with a film of water which freezes, forming a substantial storage coating of ice during the course of operation. Since the actual cooling of the air takes place as a result of the melting ice, sufficient moisture will be present to maintain the cooled air at a satisfactory humidity, which is sufficiently constant to materially add to the comfort of the occupants of the auditorium, hall, or other structure being cooled.

I may also provide a modified form of air conditioning apparatus C, as shown in Figures 7 and 8, which includes a preferably rectilinear heat insulated chamber 38 having opposed parallel end walls 39, opposed parallel side walls 40, and horizontally disposed top and bottom walls 41, 42. Mounted in the end walls 39 and opening into the chamber 38 just above the bottom wall 42, are opposed air ducts 43, 44, respectively connected at their remote ends to conventional blower and air circulating equipment (not shown).

Mounted at one end in an end wall 39 and projecting at the other end through the opposite end wall 39, and extending horizontally across the interior of the chamber 38 above the plane of the air ducts 43, 44, is a pair of parallel rods 45 provided on their projecting end with handles 45'. Swingably supported on the rods 45, is a pair of opposed gates or doors 46 adapted to swing from the position shown in Figure 8 to the position shown in Figure 9 for sub-dividing the chamber 38 into an upper compartment c and a lower compartment c' and supported in horizontal or closed position by means of horizontal abutment strips 47 fixed upon the inner faces of the opposed side walls 40. Mounted within the chamber c', is an open-ended preferably metallic trough 48 having a bottom wall 49 provided with a drain pipe 50 and a false bottom 51 formed of screen mesh or other foraminous material, all as best seen in Figures 8 and 9 and for purposes presently appearing.

Supported in the upper compartment c by a plurality of conventional tie rods 52, is a cooler unit 8 connected and functioning substantially as previously described. Also operatively mounted in, and extending through, the upper chamber c in juxtaposition to the outer faces of the cooler unit 8, is a plurality of horizontally disposed water spray pipes 53, as best seen in Figure 8 and for purposes presently fully appearing. It should be pointed out in this connection that the lower horizontal margin of the cooler unit 8 should be positioned a sufficient distance above the plane of the rods 45 to allow for clearance of the doors 46.

In use, water is sprayed from the pipes 53 upon the outer surfaces of the cooler unit 8 and frozen to form a substantially thick storage layer of ice. This ice-forming cycle may be carried on for any length of time, depending upon the particular needs and individual characteristics of the particular installation. At any predetermined time, the water spray may be shut off and the freezing operation of the cooler unit 8 shut down. Either by increasing of the back pressure or any other suitable means, the storage layer of ice is dropped down into the lower compartment c' upon the screen or false bottom 51. It will, of course, be evident that the volumetric capacity of the compartment c' must be sufficient to loosely accommodate all of the ice which has been formed on the surfaces of the cooler unit 8, so that the doors 46 may be swung downwardly into closure-forming position. Thereupon, air may be blown through the duct 43 and the cracked ice within the compartment c' for producing a highly efficient and satisfactory air cooling and conditioning effect.

If desired, the cooler unit may again be set in operation during the air conditioning cycle and the water spray turned on for rebuilding a sufficient storage layer of ice. In such case, however, some conventional means may be installed to catch any excess water dropping downwardly off of the cooler unit 8 and prevent such excess water from seeping through the doors 46 into the lower compartment c', or care must be observed to keep the rate of flow of the water spray at such volume that the entire quantity of water impinging upon the cooler unit 8 will be frozen and thereby prevented from dripping downwardly upon the doors 46 and seeping into the lower compartment c'.

Instead of the spray pipes 53, I may provide a header 54 operatively mounted above the cooling unit 8 and provided on either side with a plurality of feeder tubes 55 for distributing water evenly to each of the cooler side walls, as shown in Figure 10. Operatively mounted beneath the cooler unit 8 is a suitable catch basin 56 provided with a conventional float control 57, an over-flow connection 58, and a recirculation pipe 59 connected to the intake side of a conventional recirculation pump 60, which is, in turn, connected at its discharge side through a recirculation pipe 61 to the header 54. The float control 57 is conventionally connected to any suitable source of water supply for introducing fresh water to compensate for evaporation and over-flow losses. If desired, the cold water resulting from the melting ice may be conventionally pumped through suitable cooling pipes for added cooling effect.

It should be understood that changes and modifications in the form, construction, arrangement, and combination of the several parts of the air conditioning apparatus may be made and substituted for those herein shown and described without departing from the nature and principle of my invention.

Having thus described my invention, what I claim and desire to secure by Letters Patent is:

1. Air conditioning apparatus comprising a chamber-providing structure having upper and lower compartments, a heat exchanger in the upper compartment, means associated with said heat exchanger for forming a coating of ice thereon, means in the lower compartment for receiving and holding the ice upon removal from the heat exchanger, and means for passing air through the lower compartment.

2. Air conditioning apparatus comprising a chambered structure having upper and lower compartments, a heat exchanger in the upper compartment, means associated with said heat exchanger for forming a coating of ice thereon, means in the lower compartment for receiving and holding the ice upon removal from the heat exchanger, and means for passing air through the lower compartment in intimate contact with the ice therein.

3. Air conditioning apparatus comprising a chambered structure having a pair of swinging door-members for dividing the chamber into upper and lower compartments, a heat exchanger in the upper compartment, means associated with said heat exchanger for forming a coating of ice thereon, means in the lower compartment for receiving and holding the ice upon removal from the heat exchanger, and means for passing air through the lower compartment.

4. Air conditioning apparatus comprising a chambered structure having a pair of swinging door-members for dividing the chamber into upper and lower compartments, a heat exchanger in the upper compartment, means associated with said heat exchanger for forming a coating of ice thereon, a false bottom in the lower compartment for receiving and holding the ice upon removal from the heat exchanger, and means for passing air through the lower compartment.

5. Air conditioning apparatus comprising a casing having an air inlet, and an air outlet, said casing further having a pair of vertical walls, a refrigerant evaporator disposed within and extending lengthwise of said casing having a transverse cross section substantially resembling an inverted tear-drop and substantially flat upwardly diverging side walls disposed in juxtaposition to the vertical walls of the casing for providing in cooperation therewith air passage channel means having greater width at the bottom than the top and communicating with said inlet and outlet, and means mounted in and extending substantially from end to end of the evaporator adjacent the top thereof for distributing refrigerant over the inner faces of the flat side walls in a downwardly flowing sheet.

6. Air conditioning apparatus comprising a casing having an air inlet, and an air outlet, said casing further having a pair of vertical walls, a refrigerant evaporator disposed within and extending lengthwise of said casing having a transverse cross section substantially resembling an inverted tear-drop and substantially flat upwardly diverging side walls disposed in juxtaposition to the vertical walls of the casing for providing in cooperation therewith air passage channel means having greater width at the bottom than the top and communicating with said inlet and outlet, means mounted in and extending substantially from end to end of the evaporator adjacent the top thereof for distributing refrigerant over the inner faces of the flat side walls in a downwardly flowing sheet, and means for spraying a liquid against the outer faces of said evaporator side walls.

GEORGE M. KLEUCKER.